United States Patent [19]

Sensabaugh

[11] 4,100,653

[45] Jul. 18, 1978

[54] DEVICE FOR ATTACHING A MICROPHONE-SPEAKER TO AN ARTICLE OF CLOTHING

[75] Inventor: Paul F. Sensabaugh, Lynchburg, Va.

[73] Assignee: General Electric Company, Lynchburg, Va.

[21] Appl. No.: 825,089

[22] Filed: Aug. 16, 1977

[51] Int. Cl.² .............................................. A45F 5/02
[52] U.S. Cl. ..................................... 24/3 J; 179/157; 224/5 H
[58] Field of Search ............... 24/3 R, 3 H, 3 J, 11 R, 24/11 P; 179/146, 153, 157; 224/5 R, 5 H; 248/478

[56] References Cited

U.S. PATENT DOCUMENTS

| 1,932,581 | 10/1933 | Gilman | 24/3 R |
| 3,384,334 | 5/1968 | Malachowslci | 248/478 |
| 3,808,642 | 5/1974 | Nation | 24/11 P |
| 3,956,701 | 5/1976 | James et al. | 224/5 H |
| 4,040,547 | 8/1977 | Dickey | 224/5 H |

*Primary Examiner*—Henry S. Jaudon
*Attorney, Agent, or Firm*—James J. Williams

[57] ABSTRACT

A microphone-speaker is removably attached to an article of clothing by a device having a sheet of flat material provided with a plurality of openings spaced along a circular circumference of selected radius and center. When fastened to the microphone-speaker, the openings form depressions. A flat resilient spring is pivotally attached to the sheet of material at the center and extends at least as far as the depressions so that a projection on the spring can engage the depressions. A clip is pivotally mounted on the spring in the vicinity of the projection and extends along the spring toward the center to one end of the clip. Means are provided to urge the one end of the clip toward the plane of the flat material so that the one end can be pivoted away from the flat material to permit an article of clothing to be resiliently held between the one end and the microphone-speaker. The clip includes means to permit a user to pull the projection out of a depression, rotate the flat spring and clip to any angle, and let the projection engage another depression. Thus, the microphone-speaker and clip can be held in any desired angular relationship so that the microphone-speaker can be positioned in the desired manner on a user's clothing.

13 Claims, 5 Drawing Figures

DEVICE FOR ATTACHING A MICROPHONE-SPEAKER TO AN ARTICLE OF CLOTHING

BACKGROUND OF THE INVENTION

My invention relates to a device for attaching a microphone-speaker or the like to an article of clothing, and particularly to such a device that permits the device to be rotated so that the microphone-speaker can be positioned as desired.

Small radio receivers, or radio transmitters and receivers, of the personal or portable type, are frequently attached to a user's clothing such as a belt or strap. To permit the user's hands to remain free and yet provide good communication, the speaker or the microphone or the microphone-speaker should be near the user's head so that he can hear received signals well or can communicate readily.

Accordingly, a primary object of my invention is to provide a new and improved device for attaching a speaker, or a microphone, or a microphone-speaker to a user's article of clothing.

Another object of my invention is to provide a new and improved device for removably attaching a speaker, or a microphone, or a microphone-speaker to a user's article of clothing.

Users of such radios have different preferences for where they attach the speaker, microphone, or microphone-speaker. Some users may prefer a pocket having a horizontal edge. Other users may prefer a coat lapel with a vertical or almost vertical edge. In any case, the speaker, microphone, or microphone-speaker should be capable of being positioned at any desired angle, regardless of the orientation of the edge of clothing material where attachment is made.

Accordingly, another object of my invention is to provide a new and improved attaching device that can be pivoted so that a speaker, microphone, or microphone-speaker can be oriented as desired and removably attached to a user's clothing.

Another object of my invention is to provide a new and improved attaching clip for a speaker, microphone, or microphone-speaker, and that also permits the speaker, microphone, or microphone-speaker to be oriented for the best use.

SUMMARY OF THE INVENTION

Briefly, these and other objects are achieved in accordance with my invention by an attaching device having a first flat surface with a plurality of depressions spaced along a circular arc that is a selected radial distance from a center. The flat surface and depressions can be in the speaker, microphone, or microphone-speaker itself. Or, the flat surface and depressions can be provided from a flat plate of material having openings therethrough that form the depressions when attached to the speaker, microphone, or microphone-speaker. A flat spring is rotatably attached to the flat surface at the center, and extends from the center to reach the depressions. The spring has a flat surface which contacts the first flat surface, and has a projection facing the first flat surface and located so as to engage the depressions. A clip is pivotally mounted on the spring, and extends from its pivotal mounting in a direction toward the center to an engaging end of the clip. Means are provided for resiliently urging the engaging end of the clip toward the first flat surface for removably holding thin material between the engaging end and the first flat surface. The flat spring is resiliently urged to cause the projection to engage the first flat surface and to fit into one of the depressions in response to the flat spring being rotated to the desired angular position. Thus, the clip can be rotated to the desired angular position and its projection allowed to engage the desired depression. This holds the clip and speaker, microphone, or microphone-speaker in the desired angular relation, and also permits the clip to removably attach the device to a user's article of clothing in the best or most desired manner.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

Figure 1:
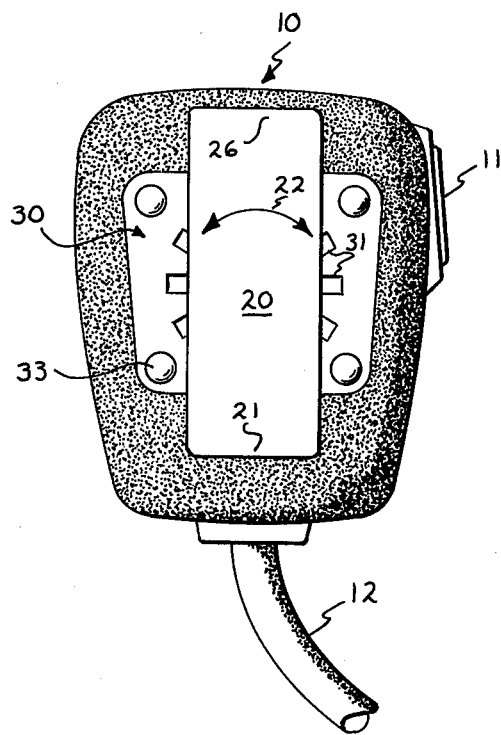
FIG. 1 shows a microphone-speaker provided with an improved attaching device in accordance with my invention.

In FIG. 1, I show the rear of a microphone-speaker 10 provided with an improved attaching device in accordance with my invention. While I describe my attaching device for use with a microphone-speaker, it is to be understood that my device can be used with other electronic devices, such as a loudspeaker, or a microphone. The microphone-speaker 10 is typically provided with a push button 11 for operating the microphone, and with a cord or cable 12 for connecting the microphone-speaker 10 to electronic equipment such as a radio transmitter and receiver. As previously pointed out, it is sometimes desirable that the microphone-speaker 10 be attached to a user's article of clothing, and that it be oriented in a particular position. This attachment can be made in accordance with my invention by a clip 20. The clip 20 is generally rectangular in shape, and can be pivoted toward and away from the microphone 10 so that a user's article of clothing or other thin material can be removably held between an end 21 and the back of the microphone-speaker 10. Further, the clip 20 can be pivoted around a circle indicated by the arc 22 so that the microphone-speaker 10 can be oriented in the desired position and held by engaging the user's clothing between the end 21 and the back of the microphone-speaker 10.

Figure 2:
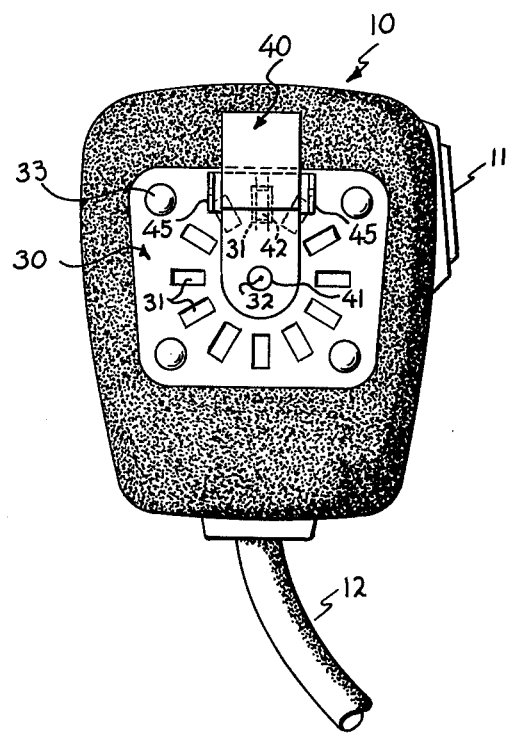
FIG. 2 shows a microphone-speaker provided with an attaching device in accordance with my invention during its assembly.
Figure 3:
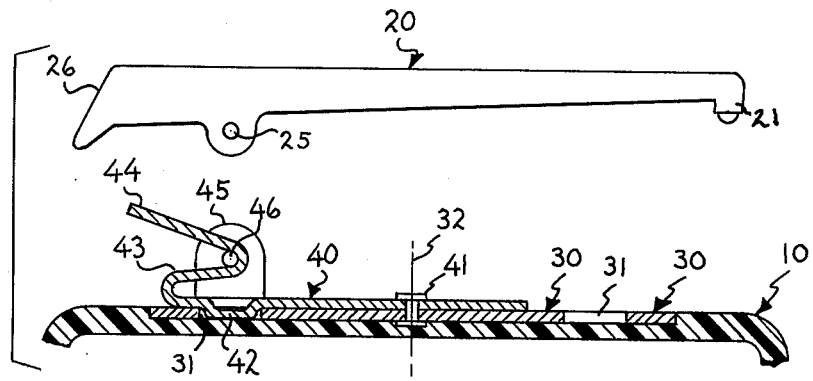
FIGS. 3, 4, and 5 show cross-sectional views of my attaching device of FIGS. 1 and 2.

FIGS. 2 and 3 show constructional details of my improved attaching device. FIG. 2 shows the rear of the microphone-speaker 10 with my device, but with the clip 20 not yet positioned. FIG. 3 shows a side view, partly in cross-section, of my attaching device with the clip 20 in position for attachment to my device. My device includes a flat, generally square metallic plate 30 which is provided with a plurality of similar, rectangularly shaped openings 31 which are spaced around the circumference of a circle having a predetermined radius and a center 32. Thus, the openings are equally spaced from the center 32. I prefer that the angular spacing of the openings 31 be equal so as to provide symmetrical pivoting of the clip 10. Any number of openings 31 can be provided, but the 12 openings shown provide good angular orientations. A thin, flat resilient spring 40 is formed from an elongated strip of spring metal. A pivot hole is punched through the strip at one end, and a projection 42 is formed at a distance from the pivot hole equal to the distance between the openings 31 and the center 32 of the plate 30. The projection 42 is formed so that it fits snugly in the openings 31. The spring 40 is then bent or formed so that it has an S or Z shape as shown in FIG. 3. After forming, the spring 40 has a long portion with the projection 42. Beyond the projection 42, the spring 40 is bent back along itself for a length 43, and then bent back along itself again for a length 44. In the vicinity of the projection 42, the spring 40 is provided with two tabs or ears 45 which extend upward away from the projection 42. Each of these tabs 45 is provided with a hole or opening 46 which receives a pivot pin 50 for the clip 20. In FIG. 3, it will be noticed that the opening 46 is aligned on the inside curvature of the bend between the lengths 43, 44 of the spring 40. After being formed, the spring 40 is rotatably attached by suitable means such as a rivet 41 to the plate 30 with the spring pivot hole at the plate center 32, with the projection 42 facing the plate 30, and with the surface of the long portion of the spring 40 engaging the surface of the plate 30.

Figure 4:
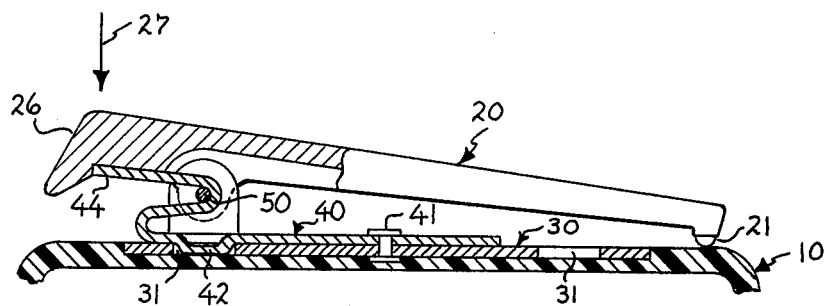

After the plate 30 and spring 40 are assembled as shown in FIG. 3, the clip 20 can be attached. The clip 20 may be made of cast metal or plastic and provided with a transverse pivot hole 25 between an engaging end 21 and an operating end 26. The clip 20 is positioned between the tabs 45 so it extends from the tabs 45 toward and beyond the center 32 in one direction, and along the spring length 44 in the opposite direction. The pivot hole 25 is aligned with the two holes 46 formed in the tabs 45 of the spring 40. Then a pivot pin 50 may be inserted through the hole 25 and the holes 46 to pivotally secure the clip 20 to the spring 40. The ends of the pivot pin 50 may be enlarged or shaped so that it will not slip out of the holes 25, 46. When this assembly is completed, the clip 20 is pivotally attached to the spring 40, and the spring 40 is rotatably attached to the plate 30 as shown in FIG. 4. This assembly is attached to the rear of the microphone-speaker 10 by rivets 33 at the four corners of the plate 30. In FIG. 4, it will be noted that the length 44 of the spring 40 engages the clip 26 and has been flexed downward. This causes the operating end 26 of the clip 20 to be urged upward as viewed in FIG. 4 and the engaging end 21 of the clip 20 to be urged downward toward the microphone-speaker 10 as viewed in FIG. 4. When the microphone-speaker 10 is to be attached to a user's article of clothing, the operating end 26 can be manually pressed downward toward the microphone-speaker 10 (in the direction of the arrow 27) to cause the clip 20 to pivot about the pin 50. The engaging end 21 moves upward as viewed in FIG. 4. An article of clothing can be inserted between the end 21 and the microphone-speaker 10, the end 26 released, and the microphone speaker 10 will be firmly held by the engagement of the engaging end 21 pressing against the microphone-speaker 10. This engagement can be enhanced or improved by placing a soft resilient material, such as rubber, at the end 21 to provide additional gripping power or friction.

Figure 5:
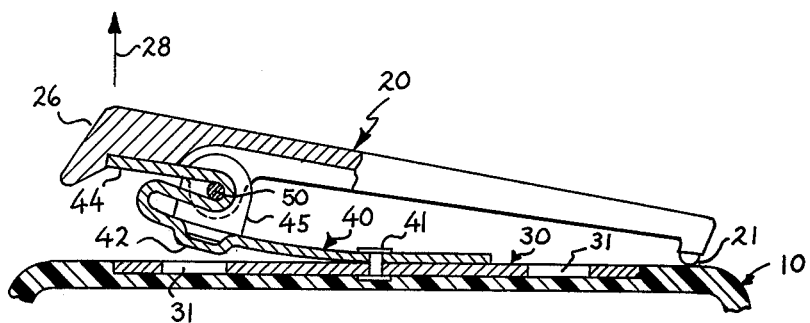

When a user desires to pivot the clip 20 about the microphone-speaker 10 along the circular line 22 of FIG. 1, he can pull the operating end 26 of the clip 20 upward and away from the microphone-speaker 10 as shown by the arrow 28 in FIG. 5. This causes the pin 50 to pull the tabs 45 and bend the long portion of the spring 40 upward so that the projection 42 is free of its engaged opening 31 in the plate 30. With the end 26 held as shown in FIG. 5, the clip 20 may then be rotated about the center 32 (and along the line 22 of FIG. 1) until it has the desired angular orientation with respect to the microphone-speaker 10. The end 26 may then be released and the projection 42 then permitted to engage a different opening 31 in the plate 30. This fixes the angular orientation of the clip 20 with respect to the microphone-speaker 10, so that the user can then push the end 26 down and cause the engaging end 21 to pivot upward and away from the microphone-speaker 10 to engage the user's article of clothing.

It will thus be seen that I have provided a new and improved device for attaching a microphone-speaker or the like to a user's article of clothing. My improved device is relatively simple and easy to manufacture, but provides a clip that can be rotatably oriented with respect to a microphone-speaker and that also can be operated to engage a user's article of clothing. The spring 40 provides resilient and firm engagement of its projection 42 with any desired opening 31, and also provides the resilient force (at its length 44) to cause the clip 20 to firmly engage clothing or the like between the end 21 and the microphone-speaker 10. While I have shown only one embodiment, persons skilled in the art will appreciate the modifications which can be made. For example, the openings 31 may have shapes other than the rectangular shape shown. Whatever the shape the openings 31 are given, I prefer that the projection 42 have a similar shape. Also, it is possible for the plate 30 to be omitted, and depressions (comparable to the openings 31) formed directly into the surface of the microphone-speaker. The clip 20 may be urged by a compression spring instead of by the length 44. Therefore, while my invention has been described with reference to a particular embodiment, it is to be understood that modifications may be made without departing from the spirit of the invention or from the scope of the claims.

What I claim as new and desire to secure by Letters Patent of the United States is:

1. An improved arrangement for removably attaching a microphone-speaker and the like to thin material such as clothing and the like comprising:
   a. a first flat surface having a plurality of depressions spaced along a circular arc spaced a selected radial distance from a center;
   b. a spring rotatably attached to said surface at said center and extending from said center for a distance at least as great as said radial distance;
   c. said spring having a flat surface contacting said first flat surface and having a projection facing said first flat surface for engaging said depressions in said first flat surface;
   d. a clip pivotally mounted on said spring and extending from its pivotal mounting in a direction towards said center to an engaging end of said clip;
   e. means for resiliently urging said clip engaging end toward said first flat surface for removably holding said thin material between said engaging end and said first flat surface;

f. and said flat spring being resiliently urged to cause said projection to engage said first flat surface and to fit into one of said depressions in response to said flat spring being rotated to the desired location, thereby locating said clip at the desired rotational position with respect to said flat surface.

2. The arrangement of claim 1 wherein said clip includes means for a user to pull said spring projection out of said depressions and rotate said spring and clip to the desired position.

3. The improved arrangement of claim 1 wherein said first flat surface is formed by a thin sheet of material having holes therethrough for forming said depressions when said sheet of material is fastened to said microphone or the like.

4. The improved arrangement of claim 3 wherein said clip includes means to permit said clip and spring to be pulled away from said first flat surface.

5. The improved arrangement of claim 4 wherein said means for urging said clip engaging surface toward said relatively flat surface comprises a portion of said spring.

6. A device for removably attaching a microphone-speaker and the like to an article of clothing and the like and for permitting the microphone-speaker to be positioned in a desired rotational position, said device comprising:
   a. a first substantially flat surface on the rear of said microphone-speaker and the like, said first surface having a plurality of depressions therein located on a circumference spaced a predetermined distance from a center;
   b. an enlongated strip of resilient material having at least one flat surface, a pivot end, a free end, and a engaging member projecting from said one flat surface in the vicinity of said free end;
   c. means rotatably fastening said strip of material in the vicinity of said pivot end to said first surface at said center for rotation about said center with said strip flat surface contacting said first surface and with said engaging member spaced from said center said predetermined distance to removably engage said depressions in said first surface;
   d. clip means pivotally attached to said strip of resilient material at a location thereon spaced from said pivot end, said clip means extending from said location in a direction toward said pivot end to an end of said clip means;
   e. and means resiliently urging said end of said clip means toward said first surface on said microphone-speaker and the like to enable said microphone-speaker and the like to be removably attached to clothing and the like positioned between said first surface and said clip end.

7. The device of claim 6 wherein said clip means includes means for a user to pull said engaging member out of said depressions and rotate said strip of resilient material and said clip to the desired angular position.

8. The device of claim 6 wherein said first surface is formed by a thin sheet of material having holes therethrough for forming said depressions when said sheet of material is fastened to said microphone-speaker and the like.

9. The device of claim 8 wherein said clip means includes an extension to permit said clip means and said free end of said strip of resilient material to be pulled away from said first surface.

10. The device of claim 9 wherein said means for urging said end of said clip means toward said flat surface comprises a part of said strip of resilient material.

11. A device for attaching a microphone-speaker to the clothing material of a user comprising:
   a. a flat sheet of material adapted to be attached to the rear face of said microphone-speaker, said sheet of material having a plurality of spaced openings therethrough that are located substantially equal distances from a center point;
   b. a Z shaped spring formed of an elongated strip of flat resilient material and having first and second ends;
   c. means for attaching said first end of said spring to said sheet of material at said center point so that a flat face of said spring is resiliently urged into engagement with a face of said sheet material and so that said second end of said elongated spring can be pivoted about said center point;
   d. a projection positioned on said flat face of said spring between said first and second ends at a distance from said point of attachment of said first end that is substantially equal to said equal distances, whereby said projection can fit into each of said spaced openings;
   e. an elongated clip having first and second ends;
   f. and means for attaching said clip at a location between its ends to said spring at a location in the vicinity of said projection so that said clip extends along and over said spring and so that said first end of said clip pivots toward and away from the plane of said sheet of material.

12. The device of claim 11 wherein said second end of said spring resiliently engages said second end of said clip so that said first end of said first clip is resiliently urged toward said plane of said sheet of material.

13. The device of claim 11 wherein said projection is integrally formed with said spring.

* * * * *